Patented Dec. 10, 1935

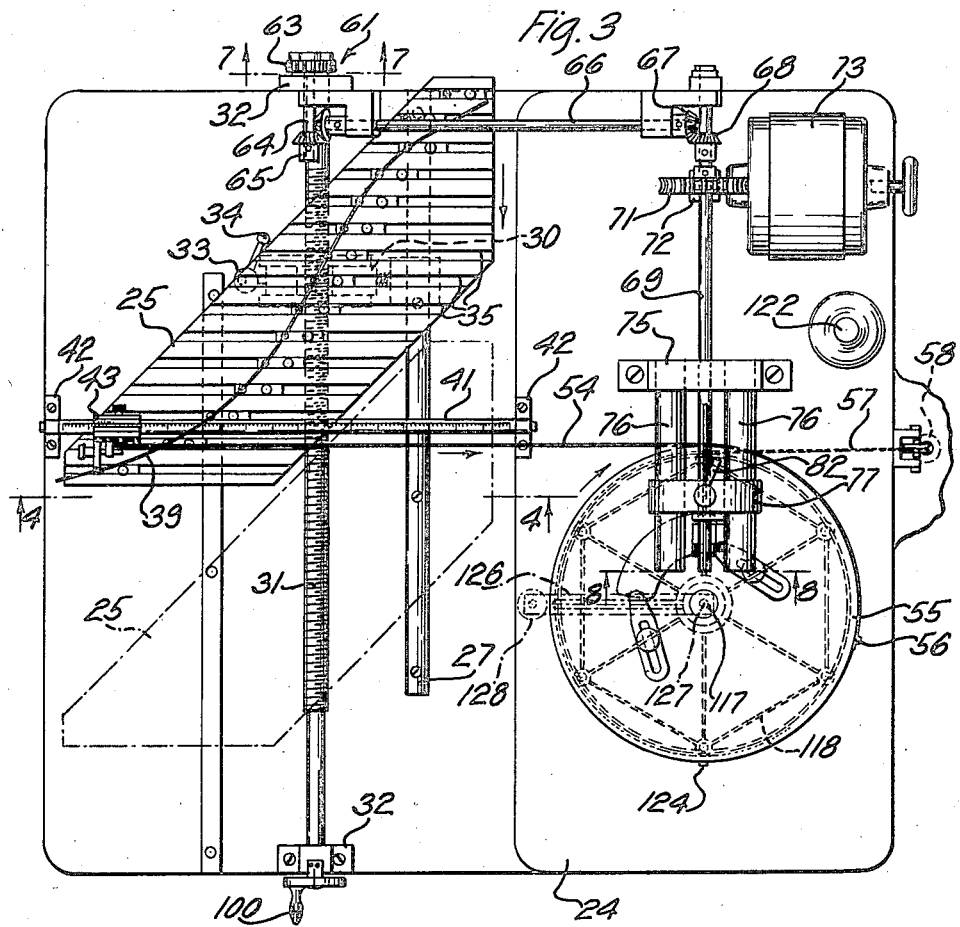

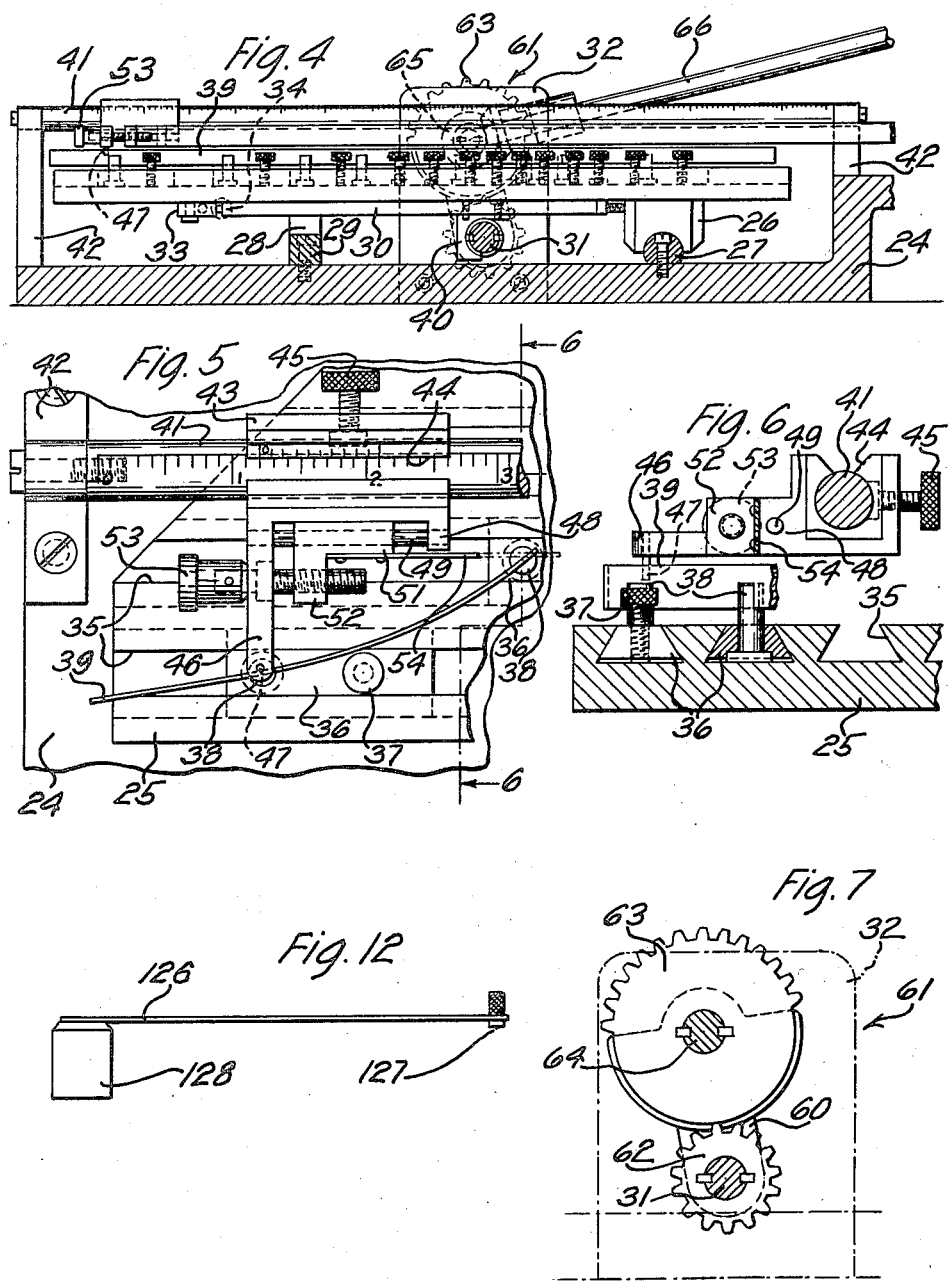

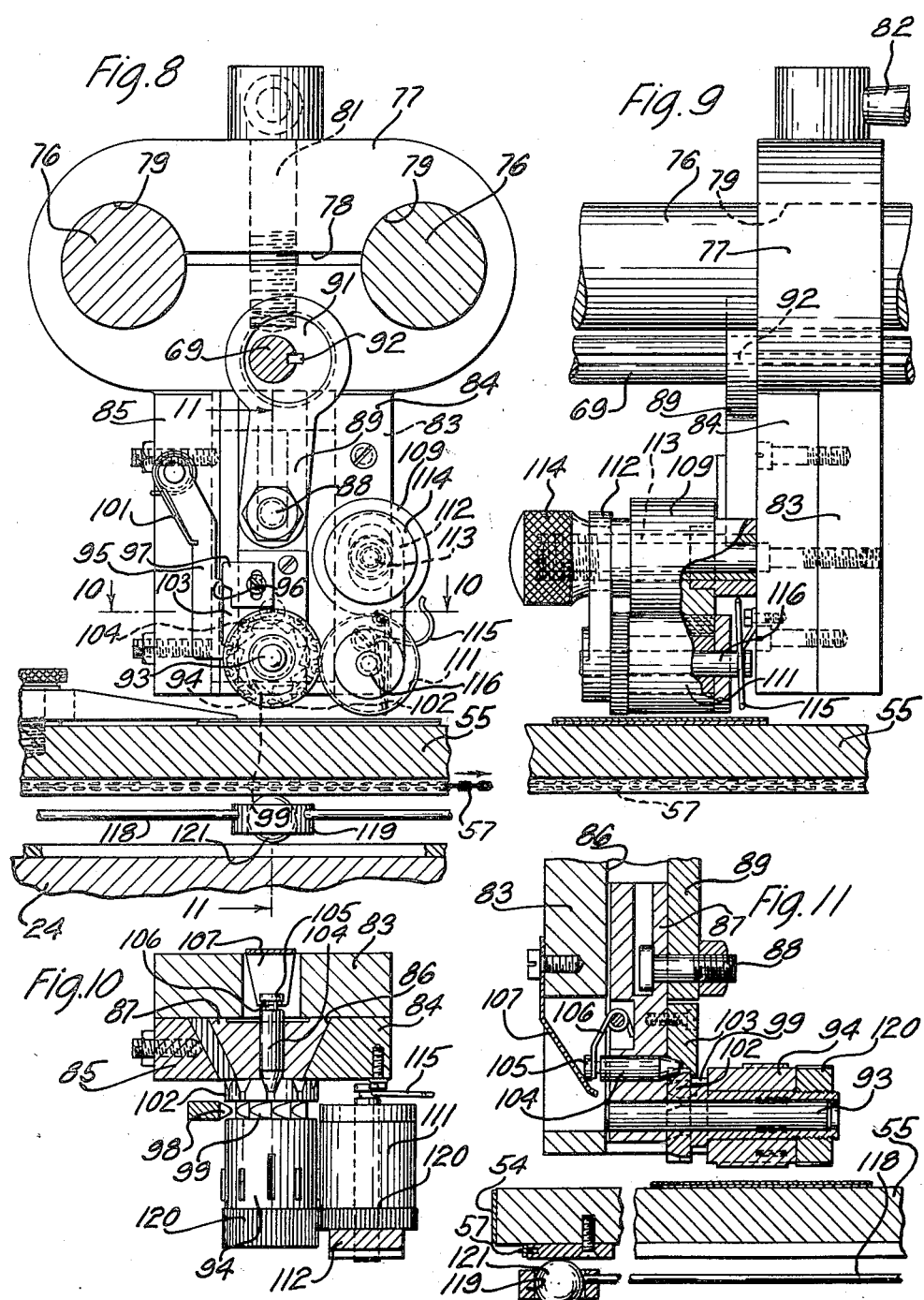

2,023,596

UNITED STATES PATENT OFFICE 2,023,596

METHOD OF AND APPARATUS FOR MAKING SCALES

Ludvik Joseph Koci, Berwyn, Ill., assignor to Western Electric Company, Incorporated, New York, N. Y., a corporation of New York Application November 12, 1931, Serial No. 574,584

17 Claims. (Cl. 33—19)

This invention relates to a method of and apparatus for making scales, and more particularly to a method of and apparatus for printing meter scales which conform to the individual characteristics of the instrument with which they are to be used.

Objects of the invention are to provide an accurate and efficient method of and apparatus for making scales.

Experience has shown that it is practically impossible to construct similar meters with such a degree of accuracy that they will possess identical characteristics and, therefore, it is necessary to make an individual scale for each meter. The same difficulty exists when a meter is repaired. It is found that usually a new scale must be made for the repaired meter.

The most commonly used method of making scales heretofore has been by determining the cardinal points of the scale and equally dividing the spaces between these points. This was usually done manually, although in some instances the lines between cardinal points were made by machines which had to be set to equally divide the lines between any two points.

In one embodiment of the present invention by which the method may be practiced, means are provided for continuously printing a graduated scale without resetting at cardinal points and the divisions between cardinal points follow a natural spacing approximating closely the characteristics of the meter for which the scale is intended.

A complete understanding of the invention may be had by reference to the following description taken in conjunction with the accompanying drawings, in which Fig. 1 represents a graph illustrating certain principles involved in the invention;

Fig. 2 is a detailed view of a typical meter scale;

Fig. 3 is a plan view of an apparatus embodying the invention;

Fig. 4 is an enlarged fragmentary sectional view taken on line 4—4 of Fig. 3;

Fig. 5 is an enlarged fragmentary plan view of a portion of the apparatus, including a graduated rod and slider;

Fig. 6 is a sectional view taken on line 6—6 of Fig. 5;

Fig. 7 is an enlarged sectional view taken on line 7—7 of Fig. 3;

Fig. 8 is an enlarged detail view of the printing device;

Fig. 9 is a side view of the device shown in Fig. 8 with parts broken away to illustrate the attachment of the inking rollers;

Fig. 10 is a sectional view taken on line 10—10 of Fig. 8;

Fig. 11 is a sectional view taken on line 11—11 of Fig. 8; and

Fig. 12 is a detail view of a hair-line index used in conjunction with the apparatus.

In making a meter scale it is convenient to plot a graph such as shown in Fig. 1 from the quantities to be measured by the meter and the deflection of the pointer of the meter. For instance, if it is desired to make a scale for an ammeter, the currents are plotted as ordinates and the deflections of the pointer of the meter are plotted as abscissas. A current of a known value, such as one ampere or a multiple thereof, is passed through the meter and the amount of deflection of the pointer is noted to obtain the first cardinal point 15 of the graph. A current of two amperes or a multiple thereof is then passed through the meter and the deflection is again noted to obtain the second cardinal point 16. The same procedure is then followed to obtain the cardinal points 17 and 18. If the cardinal points are connected by straight lines 19, a vertical projection of equal increments of current will give an equal spacing of division lines between the cardinal points, as shown in scale 21. However, if a larger number of cardinal points are taken, it will be found that the line connecting the present cardinal points will most likely not be a straight line but will follow a curve such as 22. If now vertical projections are taken of equal increments of current on the curved line, a scale 23 will be produced in which the division lines between the cardinal points are not equally spaced but represent a natural or true division, which approximates closely the scale which would have been produced if an infinite number of cardinal points had been plotted.

The apparatus of this invention is designed to automatically produce a meter scale of the type shown at 23 and comprises a base 24 upon which the apparatus is mounted. Movably mounted upon the base is a rack 25 having a downwardly extending projection 26 slidably engaging a rail 27 of substantially circular cross-section. A second downwardly extending projection 28 slidably engages a rail 29. Underneath the rack is a screw 31 rotatably journaled in bearings 32 mounted on the base. Slidably secured to the lower side of the rack is a bar 30 carrying a concave projection 40, which engages the screw 31. The end of bar 30 is engaged by an eccentric 33 provided with a handle 34 by means of which the projection 40 may be engaged with or disengaged from screw 31. It will be seen that when the projection 40 engages screw 31, a rotation of the screw will move the rack longitudinally on the base.

The upper face of the rack is provided with a plurality of transverse dove-tail grooves 35 in which adjusters or spacers 36 are slidably positioned. Each spacer consists of a wedge shaped block fitted into the dove-tail groove, a thumb screw 37 for locking the block in position and a pivotally mounted pin 38 having a slot in its upper end for receiving a resilient member 39 of steel or other suitable resilient material. This resilient member is formed into a curve based upon the cardinal points of the meter, as will be described later.

Above rack 25 is a rod 41 rigidly supported by standards 42. This rod is provided with graduated marks and carries a slider 43 which substantially encloses the rod, except for a V-shaped longitudinal slot 44 in its upper face, through which the graduations on the rod may be seen. The rear side of the slider is provided with a thumb screw 45 by means of which the slider may be secured in fixed position. The slider 43 has a forwardly projecting arm 46 carrying a downwardly projecting pin 47, which engages behind the curved resilient member 39. Between arm 46 and a projection 48, the slider carries a pin 49 on which a block 51 is slidably mounted. This block has an internally threaded projection 52 cooperating with a thumb screw 53 projecting through arm 46 for adjusting the position of block 51 relative to the slider. Attached to the block 51 of the slider is a flexible strap 54 which extends around a rotatable member 55 mounted on the base and is secured to a projection 56 on the rotatable member.

The rotatable member also has a chain 57 extending partially around its periphery, to which a weight 58 is attached, tending to normally rotate the rotatable member in a clockwise direction.

It will be seen that as the rack 25 is moved forwardly, as viewed in Fig. 3, slider 43 will be drawn to the right by the rotatable member a distance determined by the curvature of resilient member 39; thus if the screw 31 were rotated intermittently to move the rack forwardly in equal steps, the rotatable member 55 would also rotate intermittently but not in equal steps, since the amount of rotation of the rotatable member will depend upon the curvature of resilient member 39.

Intermittent movement is imparted to the screw 31 by means of Geneva movement 61, the intermittent gear 62 of which is attached to the end of screw shaft 31 and the constantly rotating gear 63 of which is attached to a shaft 64 supported in bearing standard 32. Since the distance between the centers of gears 62 and 63 will remain constant, regardless of the number of teeth on the periphery of gear 63, it is evident that the Geneva movement may be readily interchanged to provide any desired amount of advance of the rack in one step. The gears 62 and 63 are interconnected by an arm 60 so that the gears may be readily removed and replaced as a unit. Shaft 64 carries a bevel gear 65 meshing with a second bevel gear on shaft 66. The opposite end of shaft 66 carries a second bevel gear 67 meshing with a bevel gear 68 on a shaft 69. Shaft 69 has a worm gear 71 actuated by a worm 72 carried by the shaft of motor 73.

The printing apparatus is mounted upon a standard 75, which carries two forwardly extending rods 76. A slidable block 77 is mounted on these rods and has a slot 78 interconnecting the rod receiving apertures 79. Extending vertically through the block is a screw 81 which has a lever 82 for clamping the block to the rods in any desired position. The block 77 is provided with a downwardly extending portion 83 having two plates 84 and 85 secured to the front face thereof to provide the vertical dove-tail groove 86, in which a plunger 87 is vertically reciprocable. The plunger has a pin 88 secured thereto which is connected through a connecting rod 89 to an eccentric 91. Eccentric 91 is carried by shaft 69 and has a key 92 which is slidable in a longitudinal slot on shaft 69 so that the eccentric may readily be shifted longitudinally on the shaft but rotates therewith. Plunger 87 is provided with a forwardly projecting shaft 93 upon which a printing roller 94 is rotatably supported. The printing roller has on its periphery 10 lines for marking the divisions of the scale, the first of which is a long line followed by four short lines and a fifth line of intermediate length for printing a scale, such as shown in Fig. 2.

In order to rotate the printing roller upon reciprocation of the plunger, a cam 95 is povitally mounted upon plate 85. This cam 95 has a shoulder 96 which cooperates with a cam plate 97 on the plunger to disengage the cam from the cylinder. The lower end of the cam is provided with an inward projection 98 adapted to engage teeth 99 on the printing roller. During the upward movement of the plunger, cam plate 97 allows the cam 95 to be engaged with the roller by means of a spring 101 and during the downward movement of the plunger the cam 95 causes the roller to rotate the distance of one line whereupon cam plate 97 will disengage cam 95 from the roller and allow the roller to continue downwardly without rotation. In order to insure that the cylinder will be in a fixed predetermined position when in printing contact with a blank scale on the rotatable member 55, a disc 102 is attached to the end of the printing roller which has a plurality of semi-circular notches in its periphery and a plate 103 secured to the plunger has a complementary semi-circular notch. Extending through the plunger is a pin 104 having a tapered end adapted to engage the circular aperture formed by the semi-circular aperture in plate 103 and one of the semi-circular apertures of disc 102 to lock the printing cylinder in position. The opposite end of pin 104 has a head 105 and a spring 106 engages this head and urges the pin to the left, as viewed in Fig. 11. The arm 83 also has a spring 107 secured thereto which extends into a cut-out portion 108 and into the path of head 105. Spring 107 is made stronger than 106 so that when the plunger is in such a position that head 105 does not engage spring 107, the spring 106 will move the pin to the left, as viewed in Fig. 11. However, when the plunger has descended to such an extent that the roller has been rotated to the proper position, head 105 will engage spring 107, causing the pin 104 to be moved to the right to lock the roller in position.

The printing roller is inked by means of a pair of rolls 109 and 111. Roll 109 is preferably made of steel and roll 111 of a composition suitable for inking the printing rolls. The rolls 109 and 111 are mounted on an arm 112 and the plate 83 has a forwardly extending shaft 113 over which the roller 109 extends. The rolls may be rotated by means of a thumb screw 114 connected to the upper roll. The entire roll assembly is slidably mounted on shaft 113 and is retained thereon by a spring 115 which engages a groove on the end of shaft 116 of roller 111 and the spring at the same time tends to retain the roller 111 in engagement with the printing roller. The printing roller and inking roller 111 may be caused to positively rotate relative to each other by providing knurled discs 120 at their ends held in engagement by spring 115.

In order to rigidly support the rotatable member 55 against the pressure of the printing roller, the pivot shaft 117 of the rotatable member has a spider 118 mounted thereon, which carries a plurality of rings 119 for positioning ball bearings 121 under the rotatable member.

The operation of the apparatus will now be described. In making a scale for a meter, the cardinal points of the meter are first determined by passing known currents of given values through the meter and noting the amount of deflection of the pointer of the meter for each current. When the cardinal points have been found, the rack is disengaged from the screw 31 to permit its free longitudinal movement, manually, or alternatively the rack may be adjusted in position by a handle 100 by removing the Geneva gear 61. The slider 43 is then set at zero and one of the spacers 36 is adjusted so that the resilient member 39 will engage the pin 47 of the slider. The rack is then withdrawn from the slider and the slider is set to indicate the amount of deflection for the first cardinal point. The rack is then again moved toward the slider and the resilient member 39 is adjusted so that the second spacer 36 will cause the resilient member to engage the pin 47.

This procedure is continued until a spacer has been placed in position for each cardinal point of the meter. In between the spacers the curve will assume a natural curvature forming a curve of the resilient member, which approximates very closely the curve which would have been obtained if an infinite number of cardinal points had been taken. After the resilient member has been formed into its desired curved form, the slider is moved to the left and the rack is moved upwardly until the curve engages pin 47 of the slider. A blank scale is then placed on the rotatable member and the rotation of the motor is started by the push button switch 122.

The motor causes the reciprocation of the printing roller which has previously been set so as to print a line of maximum length first. The position of the first line may be controlled by adjusting thumb screw 53 on slider 43. The motor also causes an intermittent forward movement of the rack 25 due to the Geneva gear 61. The gear trains for driving the Geneva movement and the printing roller are so chosen that the printing roller will be out of contact with the rotatable member during the advance of the rack and will print a division on the scale during the stationary period of the rack. It will be noted that while the rack advances forwardly in equal steps the rotation of the rotatable member 55 will be in unequal steps determined by the curvature of the resilient member 39. It is evident that the Geneva gear may be interchanged for one which will cause a larger or smaller advance of the rack, depending upon the number of cardinal points and accuracy desired in the printing scale.

Another method that may be followed in printing the scale is by what may be called a master scale method. A master scale is simply a scale in which the divisions are equal from one end of the scale to the other. In making a scale by this method, the master scale is placed in the meter and pin holes are made on the scale at cardinal points. The master scale with the pin holes is then clamped to the rotatable member by the usual clamps 123. It will be seen that this places the scale under the printing device and in order to make the scale more accessible a second projection 124 is provided on the rotatable member 55 to which the flexible strap 54 may be attached so as to bring the scale counter-clockwise into convenient position during the setting of the apparatus. A hair-line index 126 is then placed across the radius of the rotatable member. This index has a pointed projection 127 adapted to rest in a small depression in the center of the rotatable member and the other end of the index is provided with a weight 128 which rests upon the base 24 and spaces the index slightly above the rotatable member. The slider 43 is now adjusted so that the zero point of the scale falls under the hair-line of the index and the point of the curve is adjusted as in the previously described method. Slider 43 is then moved so as to cause the hair-line to fall over the first cardinal point represented by a pin hole on the master scale and the curve is again adjusted. This process is continued until the resilient member has been adjusted for all of the cardinal points and after the resilient member has been correctly formed, the master scale is replaced by a blank scale and the blank scale is moved under the printing roller by connecting strap 54 to projection 56 and then printed in the same manner as described above.

It will be understood that the nature and embodiment of the invention herein described and illustrated is merely a convenient and useful form of the invention and many changes and modifications may be made therein without departing from the spirit and scope of the invention.

What is claimed is:

1. An apparatus for marking scales comprising a movable and formable curve member, means for moving said curve member in steps, a rotatable member for supporting a blank scale, means for rotating said rotatable member in steps determined by the curvature of the curve member, and means for marking said scale at points spaced proportionately to the steps of rotation of the rotatable member.

2. An apparatus for marking scales comprising a movable member having a curved outline, means for intermittently moving said member, a rotatable member for supporting a blank scale, means for intermittently indexing said rotatable means an amount determined by the curvature of said member, and means for marking said scale at points on a fixed radius of the axis of rotation of said rotatable member.

3. An apparatus for marking scales comprising a rotatable member for supporting a blank scale, a printing device having a rotatable printing cylinder, means for moving the cylinder into and out of contact with the rotatable member to print indicia on the scale, means for rotating and locking the cylinder in angular position while out of contact with the rotatable member, and means for intermittently rotating the rotatable member while the cylinder is out of contact therewith.

4. An apparatus for marking scales comprising a movable rack, a plurality of spacers on said rack, a resilient member secured to and formed into a curve by said spacers, a guide adapted to follow said curve upon movement of the rack, a rotatable member for supporting a blank scale, means for intermittently moving said rack, thereby causing intermittent movement of said guide, means for transmitting the movement of said guide to the rotatable member, and means for marking indicia on said scale while the rotatable member is at rest.

5. An apparatus for automatically marking scales comprising a movable member having a curved outline, means for intermittently moving said member, means for supporting a blank scale, means for intermittently moving said scale supporting means in response to the movement and curvature of said curved member, and means for marking said scale at spaced points determined by the amount of movement of the scale supporting means.

6. An apparatus for automatically marking scales comprising a curved member, a movable support therefor, a scale adjacent the support, means for moving said support for adjusting the curved member on the support relative to said scale, a blank scale support, means for moving the blank scale support in response to movement of the curve support and in accordance with the curvature of the curved member, and means for marking the blank scale, the spacing of the marks being equal to the movement of the blank scale support.

7. An apparatus for marking scales comprising a movable curve member, means for moving said curve member in steps, a support for a blank scale, means for moving said support in steps determined by the curvature of the curve member, and means for marking said scale at points spaced proportionately to the steps of movement of said support.

8. An apparatus for marking scales comprising a movable support for a blank scale, a curve member and support therefor, means for moving the curve support in a direction substantially perpendicular to the movement of the scale at the point to be marked, and means for moving the scale support an amount dependent on the curvature of the curve member.

9. An apparatus for marking scales comprising a circular support for a blank scale, a curve member and support therefor, means for moving said curve support in a direction perpendicular to a tangent of said circular support, a guide member engaging said curve at a point intersected by said tangent, and means associated with said guide member for moving said blank support in accordance with the curvature of said curve member.

10. An apparatus for marking scales comprising a movable support for a blank scale, a curve member and support therefor, means for moving the curve support in a direction substantially perpendicular to the movement of the scale at the point to be marked, means for moving the scale support an amount dependent on the curvature of the curve member, and means for marking said scale in accordance with the movement thereof.

11. An apparatus for marking scales comprising a circular support for a blank scale, a curve member and support therefor, means for moving said curve support in a direction perpendicular to a tangent of said circular support, a guide member engaging said curve at a point intersected by said tangent, means associated with said guide member for moving said blank support in accordance with the curvature of said curve member, and means for marking the scale in accordance with its movement.

12. An apparatus for marking scales comprising a curve support, a curve supported thereon, means for intermittently moving said support in a straight line, a guide member movable transversely to said support in accordance with the curvature of said curve, a blank scale support, and means including said member for moving said scale support in accordance with the curvature of said curve member.

13. An apparatus for marking scales comprising a curve support, a curve supported thereon, a blank scale support, means for applying a continuous force to the scale support for urging the scale support in one direction, said force being opposed by said curve, and means for causing a relative movement of said curve support to permit said force to move the scale support in accordance with the curvature of said curve.

14. An apparatus for marking scales comprising a curve member, a support therefor, means for intermittently moving said support in predetermined equal steps, a scale support, and means for moving said scale support in steps which are a function of the curvature of said curve member.

15. An apparatus for marking scales comprising a curve member, a support therefor, means for intermittently moving said support in predetermined equal steps, means engageable with said curve member and movable in accordance with the curvature thereof in a direction transversely to the direction of movement of said support, and a scale support movable in response to the movement of said last mentioned means.

16. The method of marking a graduated scale, in which a marker and scale having relative movement are used, comprising moving a curved surface in a direction transversely to the direction of said relative movement at the point to be marked, and causing a relative movement of the scale and marker in response thereto and proportional to the slope of said curved surface.

17. An apparatus for marking a scale for a meter comprising a curve member formable to represent a coordinate curve of the meter characteristics, a blank scale support, a marking device associated therewith, and means for moving said marking device relative to said scale support in accordance with the projection of the curvature of said curve member on one of its coordinate axes.

LUDVIK JOSEPH KOCI.